United States Patent
Endo et al.

(10) Patent No.: US 10,733,633 B2
(45) Date of Patent: Aug. 4, 2020

(54) REAL TIME DEBUGGING IN ONLINE VIDEO ADVERTISEMENT SYSTEM

(71) Applicant: Oath Inc., Sunnyvale, CA (US)

(72) Inventors: Jason Endo, San Francisco, CA (US); Daniel Hsiung, San Francisco, CA (US); Aaron Stone, San Francisco, CA (US); Amanda Roever, San Francisco, CA (US); Evan Kuhn, San Francisco, CA (US)

(73) Assignee: Oath Inc., New York, NY (US)

( * ) Notice: Subject to any disclaimer, the term of this patent is extended or adjusted under 35 U.S.C. 154(b) by 426 days.

(21) Appl. No.: 14/337,110

(22) Filed: Jul. 21, 2014

(65) Prior Publication Data

US 2015/0339730 A1    Nov. 26, 2015

Related U.S. Application Data

(60) Provisional application No. 61/856,529, filed on Jul. 19, 2013.

(51) Int. Cl.
*G06Q 30/02* (2012.01)
*G06Q 30/08* (2012.01)

(52) U.S. Cl.
CPC ..... *G06Q 30/0275* (2013.01); *G06Q 30/0241* (2013.01); *G06Q 30/08* (2013.01)

(58) Field of Classification Search
CPC . G06Q 30/0275; G06Q 30/0241; G06Q 30/08
See application file for complete search history.

(56) References Cited

U.S. PATENT DOCUMENTS

| | | | | |
|---|---|---|---|---|
| 6,061,518 A | * | 5/2000 | Hoffman | G06F 11/362 714/38.1 |
| 8,566,150 B2 | * | 10/2013 | Chen | G06Q 30/00 705/14.43 |
| 2007/0130015 A1 | * | 6/2007 | Starr | G06Q 30/02 705/14.46 |
| 2010/0145794 A1 | * | 6/2010 | Barger | G06F 17/30867 705/14.45 |
| 2010/0262498 A1 | * | 10/2010 | Nolet | G06Q 30/02 705/14.71 |
| 2011/0231264 A1 | * | 9/2011 | Dilling | G06Q 30/02 705/14.71 |

* cited by examiner

*Primary Examiner* — Colleen A Hoar
(74) *Attorney, Agent, or Firm* — Cooper Legal Group, LLC

(57) ABSTRACT

Techniques for monitoring an online video advertisement system include receiving a request for insertion of an online video advertisement, determining, selectively based on presence of a debug suffix, whether the request includes a debug request, performing a bidding auction to select a winning bid, and sending debug information, in response to the request, upon determination that the request includes the debug request. The debug data includes bid data received during the bidding auction. In one advantageous aspect, the use of hypertext transfer protocol headers to communicate debug information allows for activation and deactivation of the debugging operation transparently, e.g., without changing the underlying application layer workflow.

10 Claims, 8 Drawing Sheets

FIG. 4

Cache-Control: no-store, no-cache, must-revalidate
Connection: close
Content-Length: 23
Content-Type: application/xml
Date: Mon, 10 Juen 2013 19:54:19 GMT
Expires: Tues, 01 Jan 1980 00:00:00 GMT
Pragma: no-cache
Set-Cookie: BR_APS=3UW9NtlmDFuk8SVsEww; expires=Tue, 10-Jun-2014 19:54:19 GMT; path=/; domain=.btrll.com
X-BR-DEBUG-MHE: {"host":"mhe-v02-21i.btrll.com","port":"80","query":"V/mhe\/iface\/6835321\/3852755\/-\/-\/-\/view,vast2?n-1370894058&debug=1","publid":6835321,"spid":3852755,"view":"vast2","Line_items":[ ],"notes":["auction performed","no winner"],"error":""}
X-BR-DEBUG-MHE: {"host":"mhe-v02-21i.btrll.com","port":"80","query":"V/mhe\/iface\/6835321\/3852755\/-\/-\/-\/view,vast2?n-1370894058&debug=1","publid":6835321,"spid":3852755,"view":"vast2","Line_items":[ ],"notes":["auction performed","no winner"],"error":""}
X-BR -DEBUG-RTB: {"hostname":"rtbd-v02-21c>btrll.com","port":9002,"query":"/v1/rtbd/6835321/3852755/54360/Ndop82QIG2LusA0snTaJ1bKJpkmQE?n-1370894058&debug=1","error":"NO_AD","bid_floor":1.250000,"publisher_id":6835321,"site_placement_id":3852755,"demand_source_id":54360,"auction_id":"Ndop82QIG2LusA0snTaJ1bKJpkmQE","user_id":"3UW9NtlmDFukBSVsEww","demand_host":"br-va.wtp101.com:80","demand_path":"/brightroll/bid","ds_content_type":"application/octet-stream","ds_connection_header":"Keep-Alive","ds_openrtb_version_header":"2.1","ds_brrtb_version_header":"1.1","request":{".message_name":"BidRequest","id":"Ndop82QIG2LusA0snTaJ1bKJpkmQE","tmax":90,"wseat{],"badv":{],"imp":{".message_name":"BidRequest.Imp","id":"1","video":{".message_name":"BidRequest.Video"," mimes":["FLV",SHOCKWAVE_FLASH"],"linearity":"LINEAR","minduration":5,"maxduration":60,"protocol":[VAST_2_0","VAST_WRAPPER_2_0"],"api":["VPAID_1_0"]"w":640,"h":480,"startdelay":0, "maxbitrate":600,"playbackmethod":["AUTOPLAY_SOUND_ON"],"delivery":["PROGRESSIVE"]," pos":"POSITION_UNKNOWN","companiontype":[ ],"companionad":[ ]},"instl":false},"site":{".message_name":"BidRequest.Site","id":"3852755","name":"Digilant RTB Testing","page":http://test.btrll.com/vast_monster?vast_url=http%3A%2F%2Frtas-v02-21b.btrll.com%2Fvast%2F3852755%3Fn%3D%5Btimestamp%5D%26debug%3D1&content_vid=http%3A%2F%2Famscdn.btrll.com%2Fproduction%2F5798%2Fbrvideo.flv%w=300&h=250&autostart=on,"cat":[ ],"sectioncat":[ ],"pagecat":[ ],"privacypolicy":"STATE_UNKNOWN","ref":http://test.btrll.com/vast_monster?vast_url=http%3A%2F%2Frtas-v02-21b.btrll.com%2Fvast%2F3852755%3Fn%3D%5Btimestamp%5D%26debug%3D1&content/vid=http%3A%2F%2Famscdn.btrll.com%2Fproduction%2F5798%2Fbrvideo.flv&w=300&h+250& autostart+on,"content":{".message_name":"BidRequest.Content","cat":[ ],"context":"CONTEXT_UNKNOWN","qagmediarating":"MATURITY_RATING_UNKNOWN","embeddable":"STATE_UNKNOWN","language":"Unknown}},"device":{".message_name":"BidRequest.Device","ip":"66.54.159.162","ua":"Mozilla/5.0 (Macintosh; Intel Mac OS X 10_78_5) Apple WebKit/537.36 (KHTML, like Gecko) Chrome/27.0.1453.93 Safari/537.36","language":"en","devicetype":"PERSONAL_COMPUTER},"user":{".message_name":"BidRequest.User","id":"3UW9NtlmDFukBSVsEww"},"ext":{".message_name":"BidRequest.Ext","is_skippable":"NO","is_fullscreenexpandable":false,"is_facebook":false,"is_incentivized":"STATE_UNKNOWN","is_syndicated":"NO","is_ugc":"STATE_UNKNOWN","max_wrapper_redirects":1,"inventor_class":"SUPERPREMIUM"}},"response":{},"ds_time":24872,"total_time":24966}

FIG. 5C

```
status_codes:
  error_offset: 100
  codes:
    - 0: SUCCESS
    - 1: TIMEOUT
    - 2: NO_AD
    - 3: BID_LT_FLOOR
    - 4: CANARY
    - 5: UUID_MISSING
    - 6: TOO_MANY_DS_CONNS
    - 100: DS_RESPONSE_CODE
    - 101: DS_CONTENT_TYPE
    - 102: INCOMPLETE_REQ_PATH
    - 103: BAD_SERIALIZED_BIDREQ
    - 104: PROTOBUF_VERSION
    - 105: BAD_SERIALIZED_SPCONF
    - 106: UUID_REQUIRED
    - 107: DS_CONNECTION_FAILED
    - 108: REQ_DS_MISMATCH
    - 109: DEMAND_CONN_ALLOC_FAILED
    - 110: BAD_SERIALIZED_BIDRESP
    - 111: BIDREQ_FILE_MISSING
    - 112: BIDREQ_FILE_TOO_BIG
    - 113: SPCONF_FILE_MISSING
    - 114: SPCONF_FILE_TOO_BIG
    - 115: DS_FILE_MISSING
    - 116: DS_FILE_TOO_BIG
    - 117: DEMAND_CB_ARG_NULL
```

FIG. 6

REAL TIME DEBUGGING IN ONLINE VIDEO ADVERTISEMENT SYSTEM

CROSS-REFERENCE TO RELATED APPLICATIONS

This patent document claims the benefit of priority under 35 U.S.C. § 119(e) to U.S. Provisional Patent Application No. 61/856,529, filed on Jul. 19, 2013. The entire content of the before-mentioned patent application is incorporated by reference as part of the disclosure of this document.

TECHNICAL FIELD

The present disclosure generally relates to digital video advertisement insertion.

BACKGROUND

Various websites can be designed to derive their revenue from displaying advertisements to users. These advertisements traditionally were in the form of static banners or animation. Presently, advances in technologies have made it possible to display video advertisements to online users. In one technique, sometimes called pre-rolling, video advertisements are played out to the user prior to providing a user-requested video or a webpage. Multiple advertisers often bid for the opportunity to be able to display a video advertisement to an online user. Video advertisement systems connect users with advertisers and often derive revenue only upon successful playout of a video to the user.

SUMMARY

The disclosed techniques provide for techniques for real time debugging in an online video advertisement system. In some embodiments, debugging is performed by modifying ongoing communication messages in the network to include a debug flag. In some embodiments, debugging is selectively activated only when making changes to the system, e.g., introducing new advertisers into the system.

In one exemplary aspect, a method for monitoring an online video advertisement system is disclosed. The method includes receiving a request for insertion of an online video advertisement, determining, selectively based on presence of a debug suffix, whether the request includes a debug request, performing a bidding auction to select a winning bid, and responding, when it is determined that the request for insertion includes a debug request, with debug information comprising bid data received during the bidding auction.

In certain embodiments, a machine-readable medium comprising machine-readable instructions for causing a processor to execute a method as described above is discussed.

In another exemplary aspect, a video advertisement system is disclosed. The system includes an advertisement server, an operator console and a video advertisement bidding server. The advertisement server is configured to transmit video advertisement bid requests to the video advertisement bidding server and provide debug information upon request. The operator console is configured to control normal operation of the advertisement server using hypertext messaging and request debug information from the advertisement server by modifying hypertext messaging with a debug suffix.

These, and other, aspects are disclosed in greater detail in detailed description below, with reference to the drawings.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is a block diagram representation of an apparatus for debugging a video advertisement system.

FIG. 5C lists another example of data made available to a user without in debug mode.

FIG. 6 lists an example of data made available to a user during debug mode operation.

DETAILED DESCRIPTION

Figure 1:
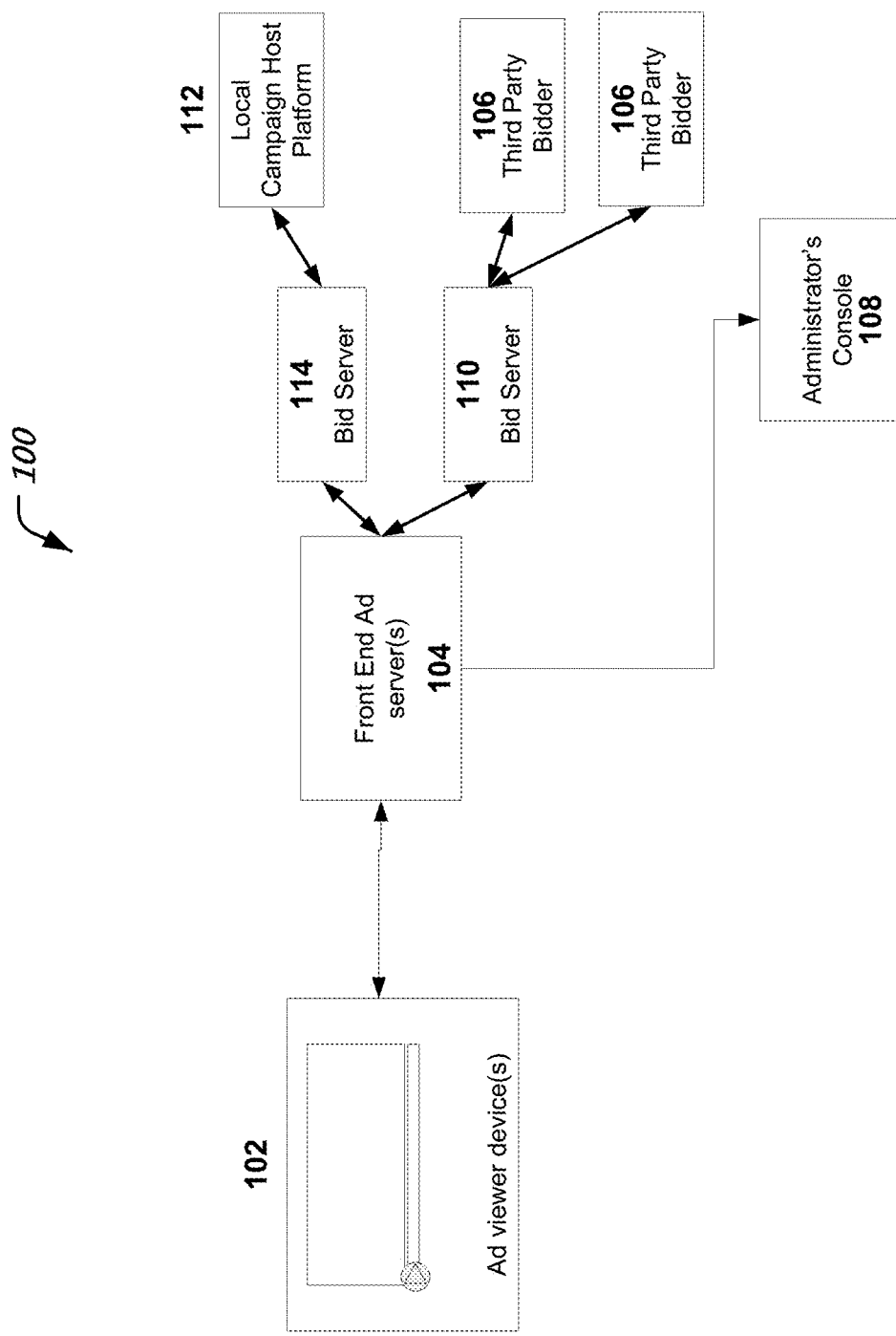
FIG. 1 illustrates a high level architecture for a video advertisement system.

In the following detailed description, numerous specific details are set forth to provide a full understanding of the present disclosure. The specific examples or embodiments of the present disclosure may be practiced without some of these specific details. In other instances, certain well-known structures and techniques may have not been shown or described in detail and are part of the present disclosure.

Advertisements on websites may be in the form of static banners or animation. With advances in technologies, video advertisements can now be played out to the user prior to providing a video or a webpage that the user has requested (often called pre-rolling). Such video ads can be valuable marketing opportunities for various products or services. In various systems that include video advertisements, a number of coordinated message exchanges may happen "behind the scene" between the time a user selects a video content for viewing or clicks on a link (e.g., a user resource locator URL) to the time a video advertisement begins to play out prior to providing the user-requested content. For example, often, the opportunity to display a video advertisement to the user is auctioned to multiple interested parties, or bidders. Responses are received from the multiple bidders and a decision is made based on the received bids and other system operational rules about a winning bid. The winning bidder is then given the opportunity to display the video advertisement to the user.

With a large number of users using the internet at any given time, one or more computers or servers that handle the generation of bid requests and reception of bids in response to the bid request may need to handle a significant amount of video advertisement insertion opportunities (or impressions), e.g., thousands per second. Furthermore, to avoid latency experienced by the user in receiving video from the time the user makes a request, there is often a tight time budget (e.g., 100 milliseconds) to orchestrate all the above-described "behind-the-scene" bidding related message exchanges.

One problem with the conventional online video advertisement systems is that often the winning bidder fails to actually display an advertisement to the user. This may happen due to one of several reasons such as failing to meet the latency (advertisement streaming times out), or incorrectly formatted message exchanges, etc. Such failures result in loss of revenue. However, because several (e.g., tens or hundreds) bids may be requested for every video advertisement placement opportunity and collecting and making available bidding data from every bid request for every bidding opportunity can be too voluminous to collect in real time and for offline analysis.

Another problem with conventional video advertisement bidding systems is that sometimes winning bidders are not able to place their advertisement (e.g., formatting error or communication error, etc.). As further described herein, the winning bidder may be a third party bidder or may be a locally hosted advertiser. However, unless the exact reason for why ad placement failed is diagnosed, this bidder may start bidding more aggressively (e.g., bid more often or bid with higher bid prices) to win ad placement. Therefore, the video advertisement system may run into the trouble that a problematic bidder may generate a large volume of bids and may keep winning bids, without being able to ultimately display video ads to viewers.

Yet another problem with conventional advertisement bidding systems is that due to the complexity of the system, and continuous interaction among different vendors' bidding systems a bidding server, any potential problems with a new bidder being added to the system can only be found out after the new bidder is online. In other words, while a new bidder is going through a test phase, any potential problems may in fact affect the performance of the live system.

The techniques provided in this document can be implemented to provide better video advertisements and may be implemented in certain ways to address one or more of those problems discussed above and other technical issues in video advertisements.

As used herein the term BRX (BrightRoll Ad Exchange) refers to a technology platform, enabling buyers and sellers to access video inventory in a self-service and scalable capacity.

As used herein, the term Impression pixel refers to a piece of code that tracks impression loads of an ad on a website (also referred to as a 1x1). As used herein, the term VAST refers to stands for Video Ad Serving Template.

As used herein, the term VPAID refers to stands for Video Player-Ad Interface Definition.

Examples of System Architecture

FIG. 1 depicts a simplified view of an online video advertisement insertion architecture 100. An ad viewer's device 102 (e.g., a wireless or a mobile device, as discussed above) may be communicatively coupled (e.g., via the internet and a wired or wireless connection) with an ad server 104. The ad server 104 may communicate bids to show video ads to the device 102 to multiple bidders 106 via a plurality of bid server platforms 110. One or more bid server platforms 114 may communicate with a host platform 112 that hosts local ad campaigns, e.g., through a business relationship with an advertiser. An operator console 108 may be provided to control the operation of the ad server 104 and bid servers 110. The ad server 104 may also be called front end ad server 104 in the sense that this ad server provides an entry into an online video advertisement system for an ad placement request from a viewer's device. The bid servers 110 may also be sometimes called the bidding interface because these servers provide an interface between third party bidding servers and the online video advertisement service.

The ad server 104 may perform functions such as handling incoming ad requests from multiple ad viewer devices 102, and respond with an ad or a "no ad" placement. The ad server 104 may operate on a time budget, e.g., 50 to 100 msec, within which it responds to an ad request. The ad server 104 may provide ad data to the viewer device 102 using VAST format. The decision about which advertisement to be sent may be based on various factors and real time data such as publisher placement, uniform resource locator (URL), a geographic location of the viewer device, time of day, demographic segment to which the viewer belongs, and so on.

As an example, in Brightroll's system the Ad server 104 can be a Real Time Ad Server (RTAS) and the bid server 110 can be an RTB-D.

When the ad server 104 receives a video placement request from the viewer's device 102, the ad server 104 may pass on the request to multiple bid servers 110, 114. The request may include information about the viewer, the viewer's demographic profile and other rules associated with the ad placement opportunity that may influence the selection of a winning bid.

The bid servers 110 in turn request bids from multiple third party bidders 106. The bid server 114 may also check whether one of its locally hosted ad campaign can avail of the ad opportunity. When bids are received from third party bidders, or at the end of a time period (e.g., 90 milliseconds), a decision is made about the winning bid. In some embodiments, the winning bid not only will have the highest dollar value but also should match the demographic profile of the viewer. For example, if the viewer is on the West coast, an advertisement for users on East coast may not be allowed to win bid even when the third party bidder bids the highest dollar value.

The winning bidder is then notified that they have won the bid. The winning bidder is provided with information to allow the winning bidder to transmit a video advertisement to the viewer. In some instances, the winning bidder may be a locally hosted ad campaign.

In some embodiments, data regarding whether or not the video actually got played back on the viewer's device is collected using impression pixels.

If a third party bidder is somehow not able to actually present his advertisement to the viewer, then this results in a wasted revenue opportunity for the operator of the video advertisement system. There may be several reasons why this failure happens. For example, the third party bidder's video (e.g., the creative) may be ill-formatted and the viewer device may not be able to play it back.

Another problem may be that a bidder with the highest bidding price may not win the bid. For maximizing revenues, it is beneficial to know why the highest bidder was not able to win the bid. For example, whether the bidder's bid had some protocol formatting issues, or whether the bid did not match the viewer's demographic profile, or whether the bid came in too late, etc. It is therefore beneficial to collect debug data associated with not just winning bids but also other bids that did not win.

Even though present day video advertisement systems provide mechanisms to bring to an operator's attention non-placement of video advertisement, where one was supposed to be shown to the viewer, but provide very little insight into why those failures occurred in the first place.

Figure 2:
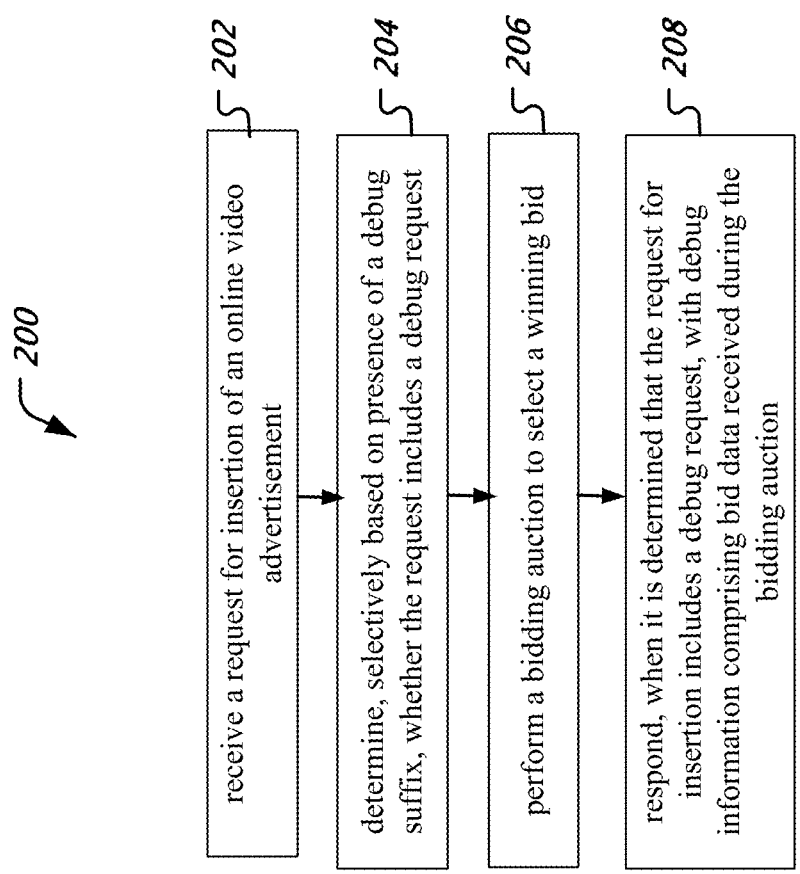
FIG. 2 is an architectural block diagram depicting a video advertiser in a video advertisement system.

FIG. 2 depicts a flowchart representation of a process 200 for monitoring a video advertisement system. The process 200 may be implemented on the ad server 104 and/or the bid server 110, 114. The process 200 could be used to provide debugging information to a system operator to catch any problems with video non-insertion or other bidding system issues.

At 202, the process 200 receives a request for insertion of an online video advertisement. The request for insertion may originate from a viewer device 102, through ad server 104 or may be a "dummy" insertion request made from the operator console 108. As previously discussed, the request may include information about user profile and other information useful in selecting a winning bid.

At 204, the process 200 determines, selectively based on presence of a debug suffix, whether the request includes a debug request. In some embodiments, the request for insertion may be formatted using the hypertext transfer (HTTP) protocol. In some embodiments, the protocol difference between a video insertion request and a video insertion request with debug request may simply be an additional flag included at the end of the video insertion request. For example, an ad insertion request without a debug request may be as follows:

https://host1.btrll.com/vast/3852288?n=1370894330    (1)

while an add insertion request with debug request may be as follows:

https://host2.btrll.com/vast/
3852288?n=1370894330&debug=1    (2)

Above examples (1) and (2) illustrate one advantageous aspect of the disclosed technology. Since debug information is includes in the http message, implementations can insert a debug message after application layer processing on the sending side, and strip the debug header and pass the rest of the http message to an application on the receiving side, thereby making the addition of debug messages to a system transparent to applications that create and use the underlying http messages.

Further, because the debug message is used at the communication message transfer protocol such as http, implementations can advantageously benefit by being able to change the fields and use of the debug message without having to make changes to the underlying application level information that may be communicated between computer platforms. A first computer platform that generates a debug message may include in the message debug data that the computer locally generates. The first computer may include debug information that the first computer has received from a second computer. In this way, using http messaging, debug messages from multiple platforms can be pooled together and sent upstream through a chain of computers or servers. On the receiving side, http message headers can similarly be removed and analyzed while the remaining message payload may be passed to an application module.

At 206, the process 200 performs a bidding auction to select a winning bid. The bidding auction may include transmitting a bid request to multiple third party bidders by including viewer profile and other parameters, receiving responses from the third party bidders and selecting the winning bid based on an operational rule (e.g., a bid that matches the viewer profile and has the highest dollar bid).

At 208, the process 200 responds, when it is determined that the request for insertion includes a debug request, with debug information comprising bid data received during the bidding auction. In some embodiments, the process 200 may also verify that the request has arrived from a trusted source, e.g., a trusted internet protocol address. One reason for verifying origination may be because debug information may include data that is proprietary or sensitive to business models of third party bidders or the bid server operator, a and therefore may not be made available to a non-trusted IP address.

In some embodiments, when a debug request is included, the process 200 may make available data received in the winning bid in a debug response message. In some embodiments, when a debug request is received, the process 200 may make available bid data from all bids received. While this data may be voluminous, an operator might find it useful to analyze all bidding information.

In some implementation, the received debug request might include a level of debugging. For example "debug=1" may indicate that all received bid request data should be included in the debug information. A request with suffix "debug=2" may indicate to include bid data from the winning bid and also from a specific third party bidder. Other custom debug requests may also be defined.

When the received video ad insertion does not include a debug request, the process 200 proceeds along the normal path of selecting a winning bid and facilitating ad placement from the winning bidder to the viewer device 102.

In some implementations, the use of a data transmission protocol such as the http protocol, and particularly the use of a transmission protocol in which headers can have variable length, is used to activate or deactivate debugging operation in a manner that is transparent to the applications that generate or use the payload of the message that use the data transmission protocol.

Figure 3:
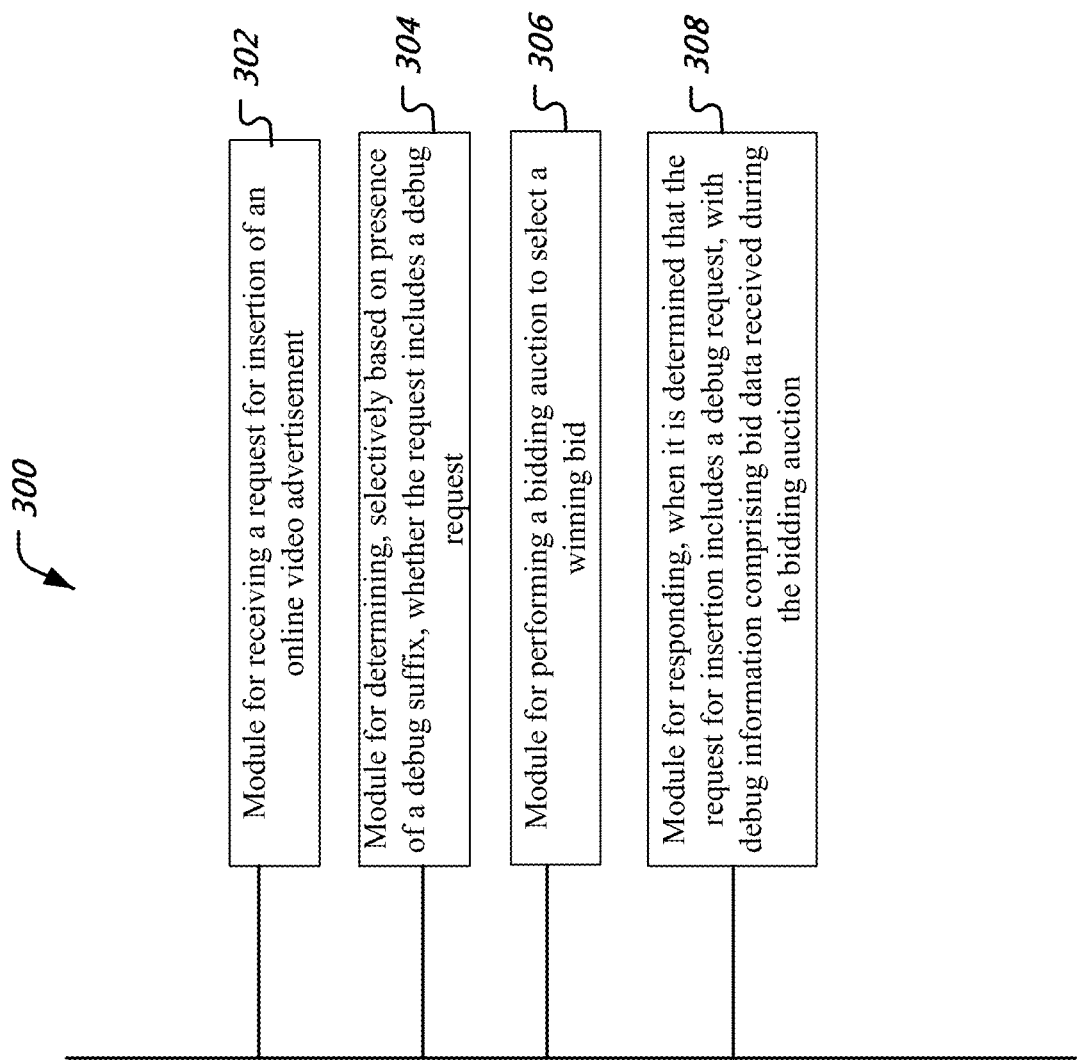
FIG. 3 is a flowchart representation of a process of monitoring.

FIG. 3 depicts a block diagram representation of a monitoring apparatus 300. The module 302 (e.g., a request receiver module) is for receiving a request for insertion of an online video advertisement. The module 304 (e.g., a debug determination module) is for determining, selectively based on presence of a debug suffix, whether the request includes a debug request. The module 206 (e.g., a bid module) is for performing a bidding auction to select a winning bid. The module 208 (a debug response module) is for responding, when it is determined that the request for insertion includes a debug request, with debug information comprising bid data received during the bidding auction. In some embodiments, the apparatus 300 also includes an online video insertion module that responds, when it is determined that request for insertion does not include a debug request, with a response comprising an abbreviated version of the debug information. In some embodiments, the debug module includes a verification module that verifies that the request for insertion was sent from a trusted internet protocol address. In some embodiments, the bid data included in the debug information comprises bid data only from the winning bid. In some embodiments, the debug information is derived from bid data received during the bidding auction. In some embodiments, the request conforms to a data transfer protocol having a variable length header, e.g., the http. In some embodiments, the debug determination module parses the request prior to taking an application layer action on the request. In some embodiments, the debug information includes a first portion that is locally generated and a second portion that is relayed on behalf of a server in the online video advertisement system. In some embodiments, the locally generated portion may include, e.g., debug information generated by monitoring the performance and responsiveness of a local application. The local application in turn may be generating its own debug data that may also be included in the debug response message as the second portion of debug information.

Figure 4:
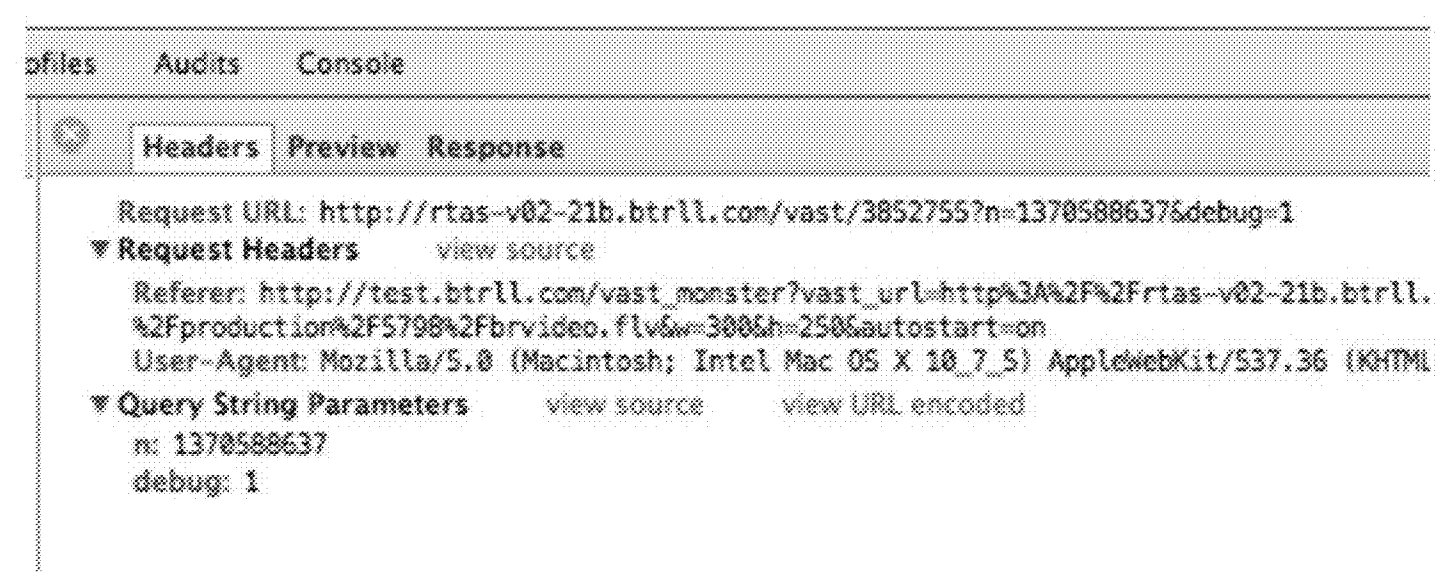

FIG. 4 provides an example of information made available to a user when debug mode is not turned on or when debug mode is turned on (as depicted in FIG. 4), but the request is received from an IP (internet protocol) address that is not a trusted IP address. It can be seen that no debug data is included in the debug response.

Figure 5A:
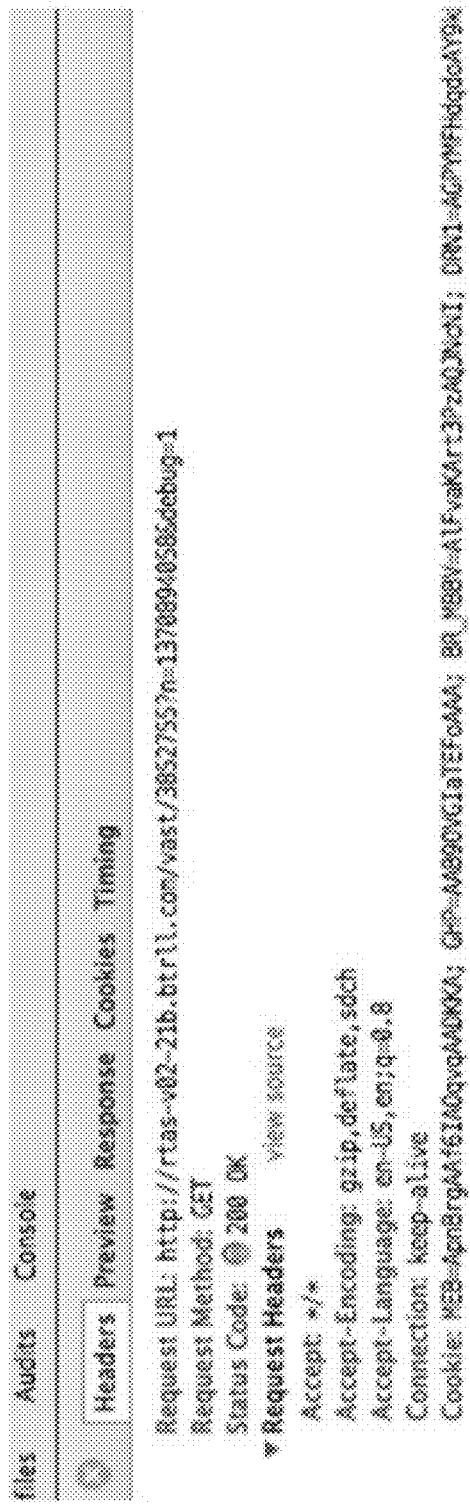
FIG. 5A lists an example of data made available to a user without in debug mode.
Figure 5B:
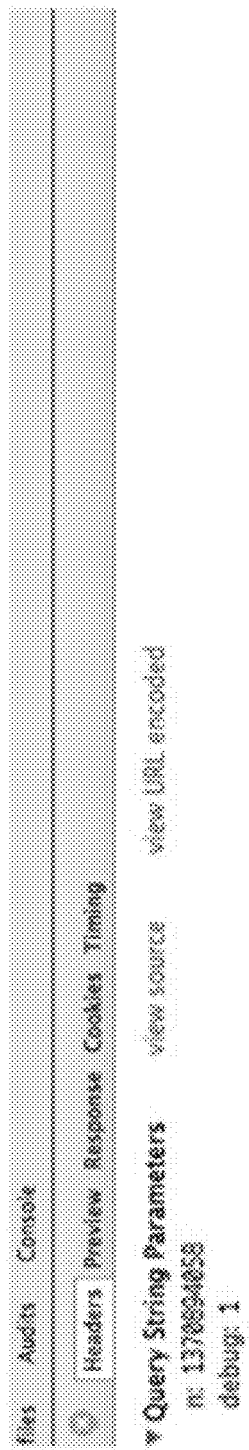
FIG. 5B lists another example of data made available to a user without in debug mode.

FIG. 5A, FIG. 5B and FIG. 5C provide example listings of different fields of debug messages made available to the system. FIG. 5A lists an example of a message in which the request header specifies various parameters of the debug request. FIG. 5B provides an example of a specific parameter for which debug information is being requested. FIG. 5C provides an example of information made available to a user when debug mode is turned on. In particular, the box 502 shows additional debug data provided to the user. The data 502 provides information that can be used to debug whether a responding bidder had completed all fields and filled in all fields with correct format when responding to the bid request. The debug data also includes a status code indicating the result of the bidding, further described below.

In some embodiments, an ad server 104 (e.g., Brightroll's RTAS) may further be configured to perform functions as follows. When a normal ad request comes in to RTAS, the RTAS workflow may be as follows:

(a) generate ad insertion request (b) if partner IDs are specified (e.g., third party bidders), then:

(i) generate auction ID in the following format:
<rand_char>d[ENCODED_STR]
Where ENCODED_STR=base64 url encoded packed array
<ip><epoch_seconds><spid><rand><crc32>

(ii) Propagate the ad insertion request to the bidding interface 110 for bids by passing along query params from external request (c) Perform auction, find winner and second price (d) If winner is a demand partner, replace price macro in VAST response. This may be accomplished by finding and replacing a particular message field with the clearing price as a percentage of their bid price. Furthermore, log demand partner ID and set line item ID field to −1 in an auction log (i.e., this third party bidder did not win the auction).

(e) If winner is an MHE (multimedia handling engine) bid, set demand partner ID to −1 in the auction log.

(f) Return winning ad to supply source that will stream the ad to the viewer.

(g) If the decision of the bid is no-ad, then pick a USER_ID cookie from any available downstream response (bidding interface 110) and set in upstream response header.

(h) Generate a log using the following formats:

Log Embodiment 1

"0,%lu,%d,%s,\"%s\",\"%s\",\"%s\"\n", (unixtime, spid, remote_ip, referrer, useragent, uniques_cookie)

Log Embodiment 2

"0,%lu,%d,%s,\"%s\",\"%s\",\"%s\",%d\n", (unixtime, spid, remote_ip, referrer, useragent, uniques_cookie, pod_id)

Auction Log Embodiment 1

"%d,%lu,%d,%d,%d,%d,%s,%d,%s,%d,%c,%c,% d\n" (RTAS_LOG_VERSION, unixtime, spid, floor, num_con- sidered_bids, max_bid, xtra1, next_bid, xtra2, actual_floor, revenue_type, publish_pricing_type, line_item_id)

Auction Log Embodiment 2

"%d,%lu,%d,%d,%d,%d,%s,%d,%s,%d,%c,%c,%d, %d\n" (RTAS_LOG_VERSION, unixtime, spid, floor, num_ considered_bids, max_bid, (xtra1 or auction_id), next_bid, auction_id, actual_floor, revenue_type, publish_ pricing_type, line_item_id, demand_partner_id, rev_share/ revshare)

pod_id: Values should be small positive ints (currently store as uint8_t) (grabbed from /etc/brinfo/podid file)
Use Value is 0 if this file is not present.

demand_partner_id: Will have a positive int32_t value if a bid server partner wins. −1 signifies a bid server partner did not win auction_id: Generated for making a request to the bid server 110 as a uniquely identifiable string.

In some embodiments, the bidding server 110 may implement the following functionality.

Multiple bid servers may be deployed, based on the number of third party bidders (partners) being served. Bid servers may be deployed in an N+1 system configuration for a single hot-available standby. For example, if there are 3 boxes in use for a given partner, there should be 1 extra box as a hot standby. All machines with a process should be equivalent for a given partner. For example, if there is a box with bidders 1, 2, 3; then a new box should only have processes for bidders 1, 2, 3.

In some implementations, the hardware platform used for a bidding server has a dedicated disk IO per process. This may be aligned with the number of available cores and restrict the number of processes per machine. The machines may have elastic IPs bound to their external interfaces which are used by partners for firewall rules.

Each process must notice its own memory utilization (via timer). If it is consuming too much memory, it must do a graceful shutdown with a core file.

During online video ad insertion operation, the bid server 110 may operate as follows:

(a) Receives HTTP GET request on /v1/bidserver/<pub_id>/<sp_id>/<ds_id>?

(b) Uses ad request headers as follows:
ip address—X-BR-VISITOR-IP
referrer—X-BR-REFERRER
BR_USER_ID cookie—X-BR-USER_ID_COOKIE (c) Parses ad request url that includes publisher ID and site placement ID (d) Parses query string from external ad request that includes a page URL (e) Determines if demand source (bidders) is eligible (f) Sends ad requests to third party bidders by includes, e.g., an auction ID, viewer video player attributes/capabilities, user ID, page URL (to where the ad is placed).

(g) If timeout is reached without receiving any bids, respond with no-ad and a corresponding status code.

(h) Otherwise, receive ad responses (bids). The response includes, a bid price and a VAST URL.

(i) Log the winning response info locally for debugging purpose. The local log may include parameters such as: auction_id, site_placement_id, demand source_id, bid_price and a result_code.

Examples of status codes (result codes) are listed in FIG. 6.

In some implementations, a method for integrating a new partner (e.g., a third party bidder) into a video advertisement system includes operating a bid server in debug mode to solicit a bid response from the new partner, along with other existing partners, for placement of a video advertisement to an online viewer, generating debug data based on the bid response received from the new partner and permitting the new partner to place video advertisements only a user confirms, based on the debug data, that the new partner's bid response is acceptable. In some implementations, the debug data that is generated based on the bid response may be injecting to an http message when sending the bid response upstream to another computer. As previously discussed, the use of http protocol can be advantageously used to generate, receive and modify debug information without having to make changes to application layer implementations such as software code.

In some implementations, the debug mode is activated by modifying the debug request, e.g., as previously described with respect to equations (1) and (2). In some implementations, the user may be able to send an offline message (i.e., a message that is sent in a communication that is separate from the video ad placement message) in which the user may make the bidding server aware of the identity of the new partner that is being integrated into the system. This helps the bidding server to ensure that all messages and status code pertaining to the new partner are correctly logged into the system.

It will be appreciated that the present document discloses techniques for debugging an online video advertisement system. The disclosed techniques can be implemented to capture debug information, when desired, for the bidding and selection process in auctioning of a site placement opportunity (i.e., an opportunity to show a video advertisement to an online user).

It will further be appreciated that the disclosed techniques could be used to bring new partners or bidders into a video ad insertion system.

It will further be appreciated that the use of headers of a data transfer protocol, e.g., the http, provides a way in which debug information can be gathered without affecting the workflow of application layer underneath. Generation, gathering and transmittal of debug data can be turned on or off based on the control word added as a suffix to an http request for bidding in a video advertisement insertion system.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method of monitoring an online video advertisement system, comprising:
   receiving, with a processor, a request for insertion of an online video advertisement, wherein the request is formatted according to a hypertext transfer protocol format;
   selectively determining, with a processor, based on a presence of a debug suffix present in a header of the request that is formatted according to the hypertext transfer protocol format, whether the request includes a debug request; and
   upon a determination that the request includes the debug request:
      stripping, with a processor, the debug suffix present in the header from the request for insertion of the online video advertisement;
      performing, with a processor at an application layer, a bidding auction to select a winning bid based on (i) bid data received during the bidding auction and (ii) information from the request for insertion of the online video advertisement after stripping of the debug suffix;
      generating, with a processor, debug information for the debug request, wherein the debug information is at least one of (i) generated based upon a first portion of the bid data associated with one or more winning bids responsive to the debug suffix having a first value, or (ii) generated based upon the first portion of the bid data and a second portion of the bid data associated with one or more non-winning bids responsive to the debug suffix having a second value; and
      sending, with a processor, in response to the debug request, the debug information; and
   upon a determination that the request does not include the debug request:
      performing, with a processor, a second bidding auction to select a second winning bid; and
      sending a response to the request comprising an abbreviated version of the debug information.

2. The method of claim 1, wherein the operation of determining whether the request includes the debug request comprises: verifying that the request for insertion was sent from a trusted internet protocol address.

3. The method of claim 1, wherein bid data included in the debug information comprises bid data only from the winning bid.

4. The method of claim 1, wherein the debug information includes debug data received from a computer in the online video advertisement system.

5. An apparatus for monitoring an online video advertisement system, comprising:
   a non-volatile memory system; and
   a processor configured to execute instructions stored in the non-volatile memory system and configured to:
      receive a request for insertion of an online video advertisement, wherein the request is formatted according to a hypertext transfer protocol format;
      selectively determine, based on presence of a debug suffix present in a header of the request that is formatted according to the hypertext transfer protocol format, whether the request includes a debug request; and
      upon a determination that the request includes the debug request:
         strip the debug suffix present in the header from the request for insertion of the online video advertisement;
         perform a bidding auction at an application layer to select a winning bid based on (i) bid data received during the bidding auction and (ii) information from the request for insertion of the online video advertisement after stripping the debug suffix;
         generate debug information for the debug request, wherein the debug information is at least one of (i) generated based upon a first portion of the bid data responsive to the debug suffix having a first value, or (ii) generated based upon the first portion of the bid data and a second portion of the bid data responsive to the debug suffix having a second value; and
         respond to the debug request with the debug information, wherein the debug information includes a third portion that is locally generated and a fourth portion that is relayed on behalf of a server in the online video advertisement system.

6. The apparatus of claim 5, wherein the processor is configured to:
   upon a determination that the request does not include the debug request:
      perform a second bidding auction to select a second winning bid; and
      respond with a response comprising an abbreviated version of the debug information.

7. The apparatus of claim 5, wherein the processor is further configured to verify that the request for insertion was sent from a trusted internet protocol address.

8. The apparatus of claim 5, wherein bid data included in the debug information comprises bid data only from the winning bid.

9. The apparatus of claim 5, wherein the debug information is derived from bid data received during the bidding auction.

10. A computer program product comprising a computer-readable medium having code stored thereon, the code, when executed by a processor, causing the processor to implement a method comprising:
    receiving a request for insertion of an online video advertisement, wherein the request is formatted according to a hypertext transfer protocol format;
    selectively determining, based on presence of a debug suffix present in a header of the request that is formatted according to the hypertext transfer protocol format, whether the request includes a debug request; and
    upon a determination that the request includes the debug request:
       performing at an application layer a bidding auction to select a winning bid based on at least one of (i) bid data received during the bidding auction or (ii) information from the request for insertion of the online video advertisement;
       generating debug information for the debug request, wherein the debug information is at least one of (i) generated based upon a first portion of the bid data responsive to the debug suffix having a first value, or (ii) generated based upon the first portion of the bid data and a second portion of the bid data responsive to the debug suffix having a second value; and sending, in response to the debug request, the debug information, wherein the debug information includes a third portion that is locally generated and a fourth portion that is relayed on behalf of a server.

* * * * *